United States Patent
Netter

(10) Patent No.: US 10,761,383 B2
(45) Date of Patent: Sep. 1, 2020

(54) PHASE MODULATOR AND OPTICAL DEVICE

(71) Applicants: ESSILOR INTERNATIONAL, Charenton-le-Pont (FR); NIKON CORPORATION, Tokyo (JP)

(72) Inventor: Estelle Netter, Charenton-le-Pont (FR)

(73) Assignees: ESSILOR INTERNATIONAL, Charenton-le-Pont (FR); NIKON CORPORATION, Tokyo (JP)

( * ) Notice: Subject to any disclaimer, the term of this patent is extended or adjusted under 35 U.S.C. 154(b) by 0 days.

(21) Appl. No.: 16/385,757

(22) Filed: Apr. 16, 2019

(65) Prior Publication Data

US 2019/0243177 A1 Aug. 8, 2019

Related U.S. Application Data

(63) Continuation of application No. PCT/JP2016/084185, filed on Nov. 11, 2016.

(51) Int. Cl.
*G02F 1/1347* (2006.01)
*G02F 1/133* (2006.01)
(Continued)

(52) U.S. Cl.
CPC ............ *G02F 1/1347* (2013.01); *G02F 1/137* (2013.01); *G02F 1/13306* (2013.01);
(Continued)

(58) Field of Classification Search
None
See application file for complete search history.

(56) References Cited

U.S. PATENT DOCUMENTS 6,137,619 A * 10/2000 Chen ................. G02F 1/055
359/245
7,165,843 B2 1/2007 Flynn et al.
(Continued)

FOREIGN PATENT DOCUMENTS

| JP | 2011-059428 A | 3/2011 |
| WO | 2006/064956 A1 | 6/2006 |
| WO | 2006/122679 A1 | 11/2006 |

OTHER PUBLICATIONS

Aug. 7, 2017 International Search Report issued in International Patent Application PCT/JP2016/084185.
(Continued)

*Primary Examiner* — Phu Vu
(74) *Attorney, Agent, or Firm* — Oliff PLC

(57) ABSTRACT

A phase modulator includes; a first liquid crystal element and a second liquid crystal element, wherein: in the state in which no voltage is applied to the first liquid crystal element nor to the second liquid crystal element, both of the first liquid crystal material and the second liquid crystal material show optical isotropy; and in the state in which a predetermined range of voltage is applied both to the first liquid crystal element and to the second liquid crystal element, the first liquid crystal material shows optically uniaxial anisotropy with a first ordinary refractive index and a first extraordinary refractive index which is larger than the first ordinary refractive index, and the second liquid crystal material shows optically uniaxial anisotropy with a second ordinary refractive index and a second extraordinary refractive index which is smaller than the second ordinary refractive index.

11 Claims, 11 Drawing Sheets

(51) Int. Cl.
*G02F 1/13363* (2006.01)
*G02F 1/137* (2006.01)
(52) U.S. Cl.
CPC ...... *G02F 1/13363* (2013.01); *G02F 1/13471* (2013.01); *G02F 2001/13793* (2013.01)

(56) References Cited

U.S. PATENT DOCUMENTS

| | | | |
|---|---|---|---|
| 7,202,926 B2 | 4/2007 | Kashima | |
| 2003/0095092 A1* | 5/2003 | Kume | G02F 1/13471 345/87 |
| 2003/0128321 A1* | 7/2003 | Nakanishi | H04N 9/3114 349/117 |
| 2004/0085486 A1* | 5/2004 | Katoh | H04N 9/3108 349/5 |
| 2013/0148921 A1 | 6/2013 | Schalberger et al. | |

OTHER PUBLICATIONS

Apr. 23, 2020 Office Action issued in European Patent Application No. 16834130.3.

* cited by examiner

PHASE MODULATOR AND OPTICAL DEVICE

TECHNICAL FIELD

The present invention relates to a phase modulator and an optical device.

BACKGROUND ART

An electro-optical phase modulator with a plurality of elements arranged between two substrates, which are produced from an optically isotropic material which becomes optically anisotropic when an electrical field is applied, is known (Patent Literature 1).

CITATION

Patent Literature

Patent Literature 1: United States Patent Application Publication No. US 2013/0148921 A1

SUMMARY OF THE INVENTION

Technical Problem

In the electro-optical phase modulator disclosed in patent literature 1, generated phase modulation (phase shift) when a light obliquely incidents thereto is extremely different from that when the light incidents thereto perpendicular to the phase modulator. Therefore, phase modulation is greatly affected by light incidence direction to the phase modulator.

The present invention provides a phase modulator and an optical device which are less affected by light incidence direction.

Solution to Problems

According to the first aspect of the present invention, a phase modulator comprises: a first liquid crystal element in which a first liquid crystal material is filled between a pair of substrates facing each other, and a second liquid crystal element in which a second liquid crystal material is filled between a pair of substrates facing each other, wherein: the first liquid crystal element and the second liquid crystal element are arranged so that a light passes through the first liquid crystal element and the second liquid crystal element; in the state in which no voltage is applied between the pair of substrates of the first liquid crystal element nor between the pair of substrates of the second liquid crystal element, the first liquid crystal material shows optical isotropy with a first isotropy refractive index and the second liquid crystal material shows optical isotropy with a second isotropy refractive index; and in the state in which a predetermined range of voltage is applied both between the pair of substrates of the first liquid crystal element and between the pair of substrates of the second liquid crystal element, the first liquid crystal material shows optically uniaxial anisotropy with a first ordinary refractive index and a first extraordinary refractive index which is larger than the first ordinary refractive index, and the second liquid crystal material shows optically uniaxial anisotropy with a second ordinary refractive index and a second extraordinary refractive index which is smaller than the second ordinary refractive index.

According to the second aspect of the present invention, in the phase modulator according to the first aspect, it is preferred that both of the first liquid crystal material and the second liquid crystal material are blue phase liquid crystal material.

According to the third aspect of the present invention, in the phase modulator according to the first or second aspect, it is preferred that in the state in which the first liquid crystal material shows optically uniaxial anisotropy, an optic axis of the first liquid crystal material is perpendicular to each substrate of the first liquid crystal element; and in the state in which the second liquid crystal material shows optically uniaxial anisotropy, an optic axis of the second liquid crystal material is perpendicular to each substrate of the second liquid crystal element.

According to the fourth aspect of the present invention, in the phase modulator according to any one of the first through third aspect, it is preferred that sum of a value calculated by subtracting the first ordinary refractive index from the first isotropy refractive index and a value calculated by subtracting the second ordinary refractive index from the second isotropy refractive index has a value other than zero.

According to the fifth aspect of the present invention, in the phase modulator according to any one of the first through fourth aspect, it is preferred that the thickness of the first liquid crystal material layer of the first liquid crystal element is substantially equal to the thickness of the second liquid crystal material layer of the second liquid crystal element.

According to the sixth aspect of the present invention, in the phase modulator according to the fifth aspect, it is preferred that in the state in which any voltage in the predetermined range is applied both between the pair of substrates of the first liquid crystal element and between the pair of substrates of the second liquid crystal element, the absolute value of the difference between the first ordinary refractive index and the first extraordinary refractive index is substantially equal to the absolute value of the difference between the second ordinary refractive index and the second extraordinary refractive index.

According to the seventh aspect of the present invention, in the phase modulator according to any one of the first through sixth aspect, it is preferred that the first isotropy refractive index and the second isotropy refractive index are substantially equal to each other; and in the state in which any voltage in the predetermined range is applied both between the pair of substrates of the first liquid crystal element and between the pair of substrates of the second liquid crystal element, the first ordinary refractive index and the second ordinary refractive index are substantially equal to each other.

According to the eighth aspect of the present invention, in the phase modulator according to any one of the first through seventh aspect, it is preferred that at least one of the first liquid crystal element and the second liquid crystal element comprises a plurality of liquid crystal elements.

According to the ninth aspect of the present invention, the phase modulator according to any one of the first through eighth aspect, it is preferred that further comprises a control unit that controls so as to apply a predetermined range of voltage between the pair of substrates of the first liquid crystal element and between the pair of substrates of the second liquid crystal element.

According to the tenth aspect of the present invention, in the phase modulator according to any one of the first through ninth aspect, it is preferred that each of the first liquid crystal element and the second liquid crystal element is divided into a plurality of separate divisional liquid crystal areas arranged in a two-dimensional array: the divisional liquid crystal areas in the first liquid crystal element arrayed correspondingly to the divisional liquid crystal areas arrayed in the second liquid crystal element; and the control unit executes control so as to apply voltages individually to each of the divisional liquid crystal areas.

According to the eleventh aspect of the present invention, an optical device comprises the phase modulator according to any one of the first through tenth aspect.

The optical device, might be one of an ophthalmic lens, an ocular visor, and sight optical systems, the ophthalmic lens is a lens which is designed to fit a spectacles frame so as to protect the eye and/or correct the sight and can be a non-corrective (also called plano or afocal lens) or corrective ophthalmic lens. A corrective lens may be a unifocal, a bifocal, a trifocal or a progressive lens. An ocular visor is understood as such found in masks, goggles, helmets or other headgears, and being designed to be positioned in front of the eyes. Here, goggles and masks refer to for example ski goggles or scuba or snorkelling masks, protection goggles, and other similar devices.

Advantageous Effect of the Invention

The present invention can provide a phase modulator and an optical device which are less affected by light incidence direction.

DESCRIPTION OF EMBODIMENTS

Figure 1:
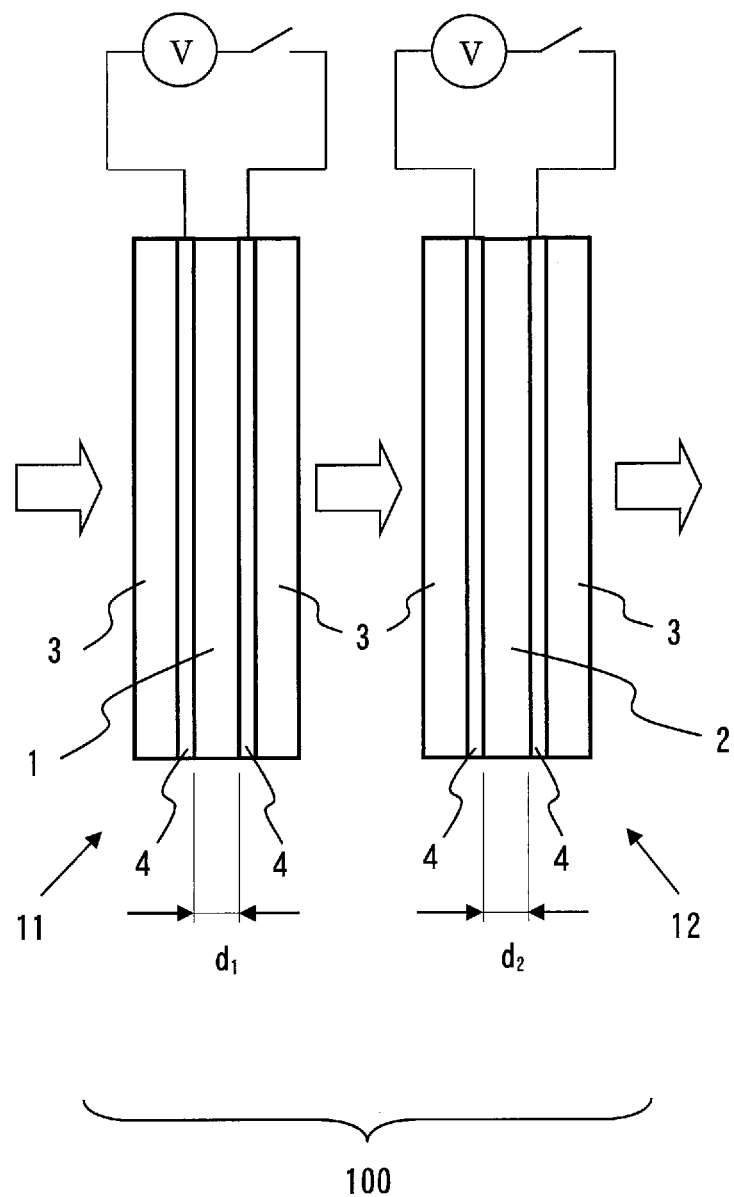
FIG. 1 is a schematic diagram showing the structure of a phase modulator according to one of the embodiment of the present invention.

In the following description, an embodiment of the present invention is explained with reference to the figures. FIG. 1 is a schematic diagram showing the structure of a phase modulator 100 according to the embodiment of the present invention. The phase modulator 100 includes a first liquid crystal element 11 and a second liquid crystal element 12. In the first liquid crystal element 11, a first liquid crystal material 1 is filled in a gap between a pair of substrates 3, and in the second liquid crystal element 12, a second liquid crystal material 2 is filled in a gap between a pair of substrates 3. The thickness of a layer of the first liquid crystal material 1 is assumed to be $d_1$, and the thickness of a layer of the second liquid crystal material 2 is assumed to be $d_2$. It is preferable that values of $d_1$ and $d_2$ are close to each other, and it is more preferable that values of $d_1$ and $d_2$ are the same. Electrode layers 4 are formed on inner surfaces (the side on which the first liquid crystal material 1 or the second liquid crystal material 2 contacts) of the pair of substrates. The first liquid crystal element 11 and the second liquid crystal element 12 are arranged in parallel to each other, and linearly polarized light passes through the first liquid crystal element 11 and the second liquid crystal element 12 in sequence. It is to be noted that there are no restrictions whatsoever with regard to the order in which the first liquid crystal element 11 and the second liquid crystal element 2 are disposed.

In a state in which no voltage is applied to each of the first liquid crystal element 11 and the second liquid crystal element 12 (hereinafter referred to as non-application condition), both of the first liquid crystal material 1 and the second liquid crystal material 2 show optical isotropy. A refractive index of the first liquid crystal material 1 in the non-application condition is referred to as a first isotropy refractive index of $n_{iso1}$, while a refractive index of the second liquid crystal material 2 in the non-application condition is referred to as a second isotropy refractive index of $n_{iso2}$. $n_{iso1}$ and $n_{iso2}$ may be equal and may be different.

In a state in which a predetermined range of voltage is applied to each of the first liquid crystal element 11 and the second liquid crystal element 12 (hereinafter referred to as application condition), both of the first liquid crystal material 1 and the second liquid crystal material 2 show optically uniaxial anisotropy. In the application condition, optic axis of each of the first liquid crystal material 1 and the second liquid crystal material 2 is substantially perpendicular to the surfaces of the substrates thereof. In each of the first liquid crystal element 11 and the second liquid crystal element 12, an refractive index in any direction parallel to the surface of the substrate (an ordinary index) is different from an refractive index in a direction perpendicular to the surface of the substrate (an extraordinary index). In each of the first liquid crystal element 11 and the second liquid crystal element 12, the ordinary index is constant in any direction parallel to the surface of the substrate. In other words, both of the first liquid crystal element 11 and the second liquid crystal element 12 are so-called c-plate. It is to be noted that the "optic axis" is different from an "optical axis" which means a center of an optical system.

It is preferable that blue phase liquid crystal material is used as each of the first liquid crystal material 1 and the second liquid crystal material 2. Moreover, polymer stabilized blue phase liquid crystal material (PSBP) is more preferable as the blue phase liquid crystal material.

The ordinary refractive index and the extra ordinary refractive index in the first liquid crystal element 11 are referred to as $n_{o1}$ and $n_{e1}$, respectively. The ordinary refractive index and the extra ordinary refractive index in the second liquid crystal element 12 are referred to as $n_{o2}$ and $n_{e2}$, respectively.

Figure 2:
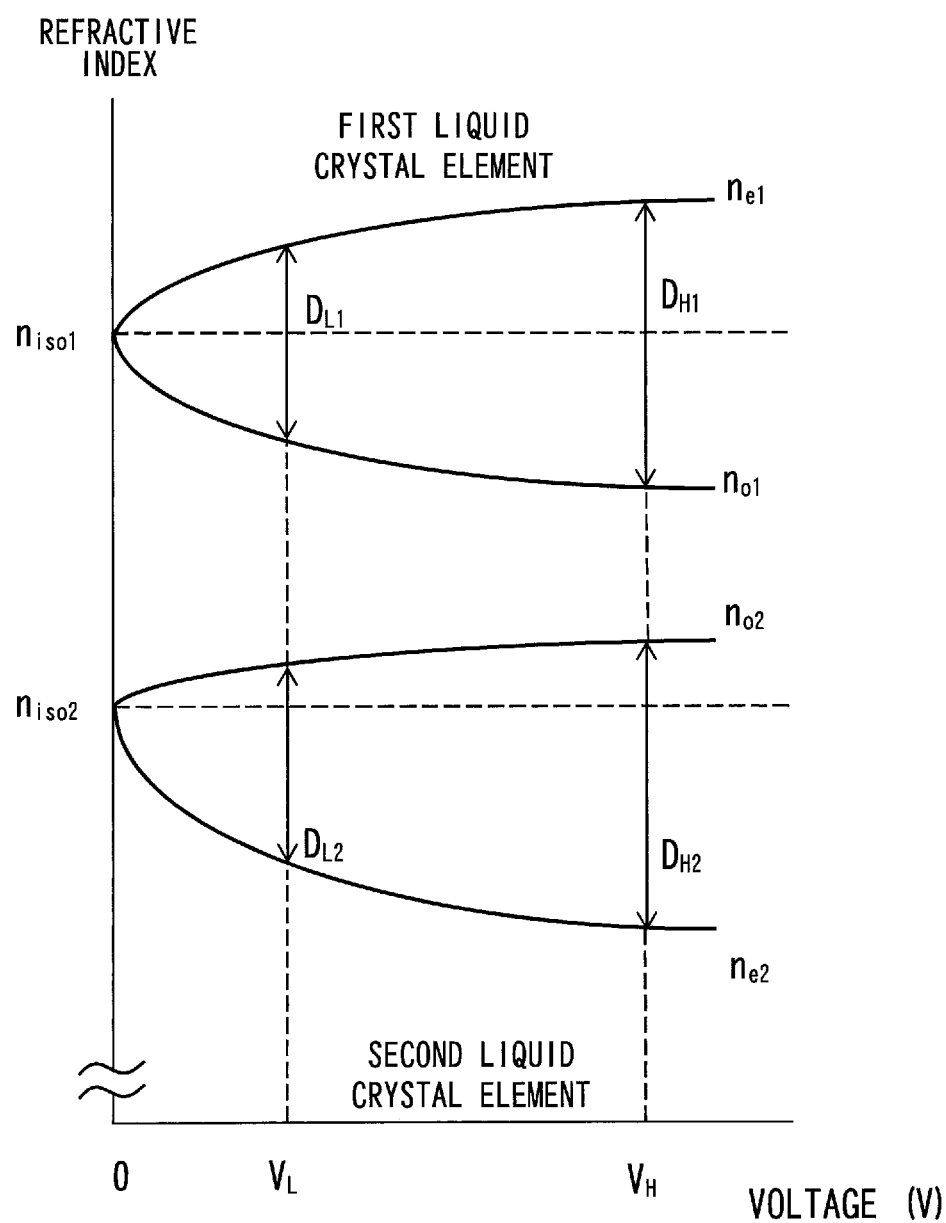
FIG. 2 is a schematic diagram showing the relationship between applied voltage to the liquid crystal elements and refractive indices of the liquid crystal elements in the phase modulator according to one of the embodiment of the present invention.

FIG. 2 is a schematic diagram showing the relationship between applied voltage to both of the first liquid crystal element 11 and the second liquid crystal element 12 and refractive indices thereof. In FIG. 2, vertical axis shows refractive index and horizontal axis shows voltage applied to the liquid crystal elements. In FIG. 2, to avoid complicating the figure, it is shown that the first isotropy refractive index $n_{iso1}$ is larger than the second isotropy refractive index $n_{iso2}$. However, the second isotropy refractive index $n_{iso2}$ may be larger than the first isotropy refractive index $n_{iso1}$, or the first isotropy refractive index $n_{iso1}$ may be equal to the second isotropy refractive index $n_{iso2}$.

When the state of the first liquid crystal element 11 is changed from the non-application condition to the application condition by applying a certain voltage to the first liquid crystal element 11, in the first liquid crystal element 11, the first isotropy refractive index $n_{iso1}$ separates into two branches of the first ordinary index $n_{o1}$ and the first extraordinary index $n_{e1}$. The first ordinary index $n_{o1}$ decreases from the first isotropy refractive index $n_{iso1}$ according to increasing of applied voltage. In contrast, the first extraordinary index $n_{e1}$ increases from the first isotropy refractive index $n_{iso1}$ according to increasing of applied voltage. In other words, the first liquid crystal element 11 functions as a positive c-plate in the application condition.

When the state of the second liquid crystal element 12 is changed from the non-application condition to the application condition by applying certain voltage to the second liquid crystal element 12, in the second liquid crystal element 12, the second isotropy refractive index $n_{iso2}$ separates into two branches of the second ordinary index $n_{o2}$ and the second extraordinary index $n_{e2}$. The second ordinary index $n_{o2}$ increases from the second isotropy refractive index $n_{iso2}$ according to increasing of applied voltage. In contrast, the second extraordinary index $n_{e2}$ decreases from the second isotropy refractive index $n_{iso2}$ according to increasing of applied voltage. In other words, the second liquid crystal element 12 functions as a negative c-plate in the application condition.

As it is shown in FIG. 2, in the case the first liquid crystal element 11 and the second liquid crystal element 12 are in the application condition respectively, the relationships of $n_{o1} < n_{e1}$ and $n_{o2} > n_{e2}$ are satisfied in respective liquid crystal element. In this regard, it is preferable that the absolute value of the difference between the first ordinary refractive index $n_{o1}$ and the first extraordinary refractive index $n_{e1}$ and the absolute value of the difference between the second ordinary refractive index $n_{o2}$ and the second extraordinary refractive index $n_{e2}$ are near. Especially if the thickness of the layer of the first liquid crystal material $d_1$ is equal to that of the second liquid crystal material $d_2$ (i.e. $d_1=d_2=d$), it is more preferable that the absolute value of the difference between the first ordinary refractive index $n_{o1}$ and the first extraordinary refractive index $n_{e1}$ is equal to the absolute value of the difference between the second ordinary refractive index $n_{o2}$ and the second extraordinary refractive index $n_{e2}$. With respect to this point, further explanation will be conducted in reference to FIG. 2. In the state in which voltage of $V_H$ is applied to each of the first liquid crystal element 11 and the second liquid crystal element 12, supposing that $n_{e1}(V_H)-n_{o1}(V_H)=D_{H1}$ and $n_{o2}(V_H)-n_{e2}(V_H)=D_{H2}$, it is preferable that $D_{H1}$ and $D_{H2}$ are near, and it is more preferable that $D_{H1}=D_{H2}$ is satisfied. Similarly, in the state in which voltage of $V_L$ is applied to each of the first liquid crystal element 11 and the second liquid crystal element 12, supposing that $n_{e1}(V_L)-n_{o1}(V_L)=D_{L1}$ and $n_{o2}(V_L)-n_{e2}(V_L)=D_{L2}$, it is preferable that $D_{L1}$ and $D_{L2}$ are near, and it is more preferable that $D_L1=D_{L2}$ is satisfied.

According to the increase in the applied voltage to the first liquid crystal element 11 and the second liquid crystal element 12, the decreasing rate of the first ordinary index $n_{o1}$ is different from the increasing rate of the second ordinary index $n_{o2}$. Thus, the following relationship is satisfied.

$$|n_{o1}-n_{iso1}| \neq |n_{o2}-n_{iso2}|$$

Therefore, when changing from the non-application condition to the application condition, the sum of the change from the first isotropy refractive index $n_{iso1}$ to the first ordinary index $n_{o1}$ and the change from the second isotropy refractive index $n_{iso2}$ to the second ordinary index $n_{o2}$ is not to be zero. Thus, next expression (1) is satisfied.

$$(n_{o1}-n_{iso1})+(n_{o2}-n_{iso2}) \neq 0 \qquad (1)$$

Furthermore, according to the change in the applied voltage to the first liquid crystal element 11 and the second liquid crystal element 12, the amount of change of the first ordinary index $n_{o1}$ (e.g. $n_{o1}(V_H)-n_{o1}(V_L)$) is different from the amount of change of the second ordinary index $n_{o2}$ (e.g. $n_{o2}(V_H)-n_{o2}(V_L)$). Therefore, the next expression (2) is satisfied.

$$(n_{o1}(V_H)-n_{o1}(V_L))+(n_{o2}(V_H)-n_{o2}(V_L)) \neq 0 \qquad (2)$$

As a magnitude of phase modulation depends on the absolute value of left side of the expression (1) or (2), it is preferable that the absolute value of left side of the expression (1) or (2) is large.

In FIG. 2, according to the increase in the applied voltage to the first liquid crystal element 11 and the second liquid crystal element 12, the decreasing rate of the first ordinary index $n_{o1}$ is larger than the increasing rate of the second ordinary index $n_{o2}$. However, this relation may be reverse, that is the decreasing rate of the first ordinary index $n_{o1}$ may be smaller than the increasing rate of the second ordinary index $n_{o2}$. In other words, among the values of $|n_{o1}-n_{iso1}|$ and $|n_{o2}-n_{iso2}|$, either of them should be larger than the other. In the case of $|n_{o1}-n_{iso1}|>|n_{o2}-n_{iso2}|$, it is preferable that following expression (3-1) is satisfied.

$$|n_{o1}-n_{iso1}|/|n_{o2}-n_{iso2}| \geq 4 \qquad (3-1)$$

In the case of $|n_{o1}-n_{iso1}|/|n_{o2}-n_{iso2}|$, it is preferable that next expression (3-2) is satisfied.

$$|n_{o2}-n_{iso2}|/|n_{o1}-n_{iso1}| \geq 4 \qquad (3-2)$$

Furthermore, according to the change in the applied voltage, in the case when $|n_{o1}(V_H)-n_{o1}(V_L)| \geq |n_{o2}(V_H)-n_{o2}(V_L)|$, it is preferable that next expression (3-2) is satisfied.

$$|n_{o1}(V_H)-n_{o1}(V_L)|/|n_{o2}(V_H)-n_{o2}(V_L)| \geq 4 \qquad (3-3)$$

In the case when $|n_{o1}(V_H)-n_{o1}(V_L)|<|n_{o2}(V_H)-n_{o2}(V_L)|$, it is preferable that next expression (3-4) is satisfied.

$$n_{o2}(V_H)-n_{o2}(V_L)/|n_{o1}(V_H)-n_{o1}(V_L)| \geq 4 \qquad (3-4)$$

Above explanation is based on that, according to the increase in the applied voltage to the first liquid crystal element 11 and the second liquid crystal element 12, among the first ordinary refractive index $n_{o1}$ and the second ordinary refractive index $n_{o2}$, either of them increases and the other decreases. However, according to the increase in the applied voltage to the first liquid crystal element 11 and the second liquid crystal element 12, both of the first ordinary refractive index $n_{o1}$ and the second ordinary refractive index $n_{o2}$ may increase concurrently or decrease concurrently. It should be noted that the first ordinary refractive index $n_{o1}$ may be substantially equal to the second ordinary refractive index $n_{o2}$ for any applied voltage. In these cases, it is not necessary to satisfy the expressions of (3-1) through (3-4).

When changing the applied voltage to each of the first liquid crystal element 11 and the second liquid crystal element 12, the phase modulator 100 generates a certain phase modulation depending on the change of the applied voltage. In the phase modulator 100, the difference between the phase modulation obtained when an incident light obliquely incidents to the phase modulator 100 and the phase modulation obtained when an incident light incidents perpendicular to the phase modulator 100 can be suppressed at a low level. With respect to this point, the explanation will be conducted next.

Figure 3A:
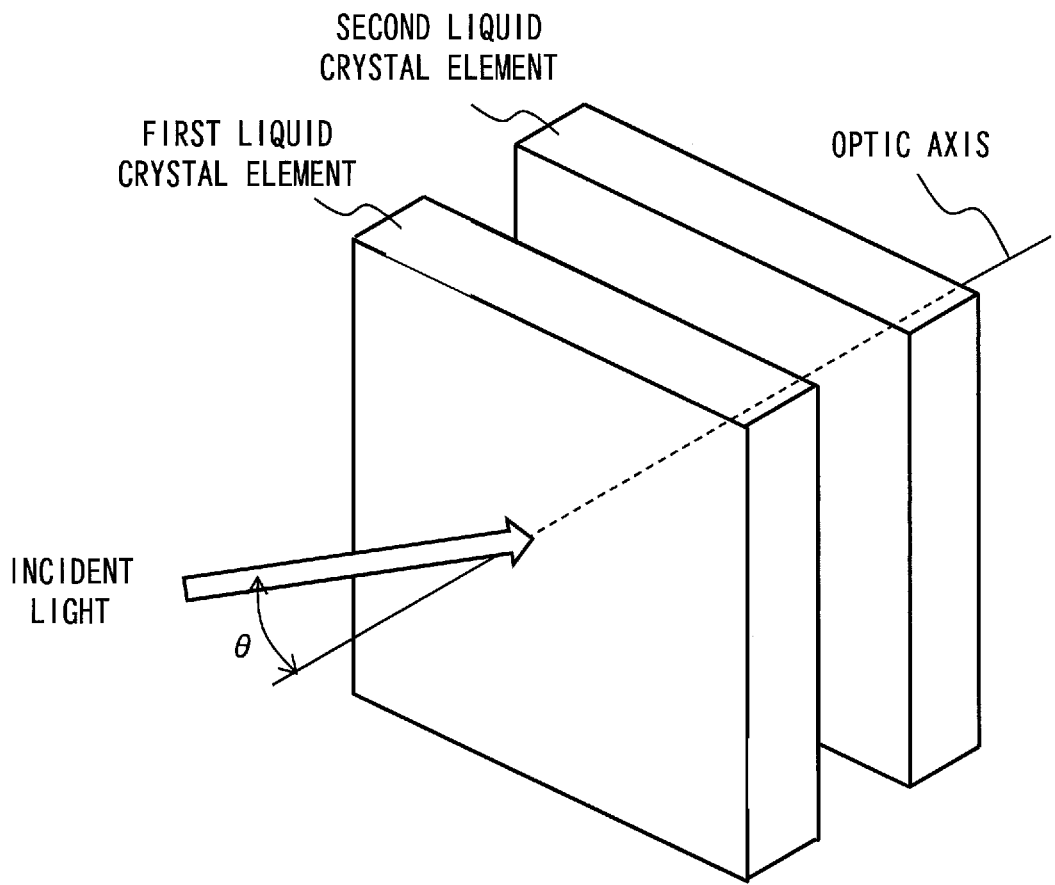
FIGS. 3A and 3B are diagrams showing an aspect in which a light obliquely incidents to the phase modulator according to one of the embodiment of the present invention, 3A is a perspective view, and 3B is a sectional view.
Figure 3B:
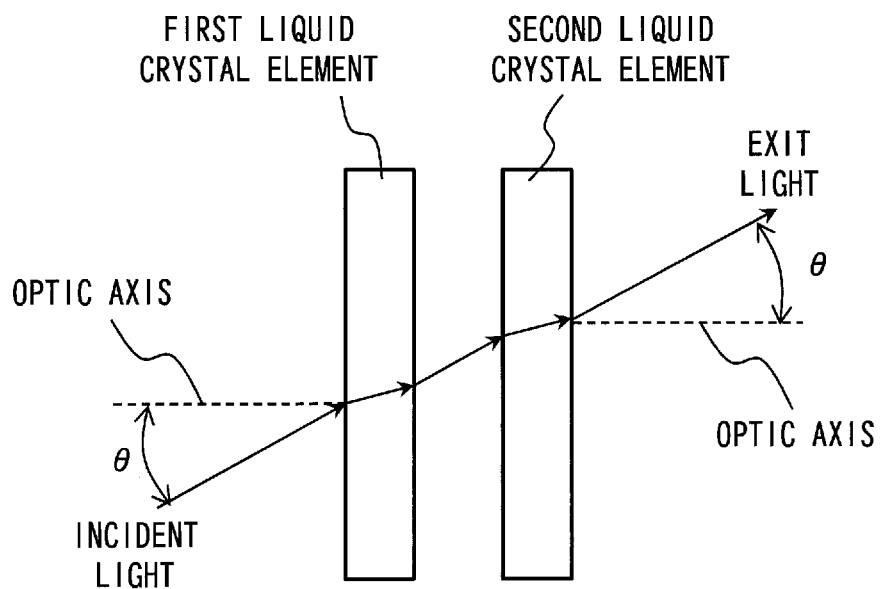
Figure 4:
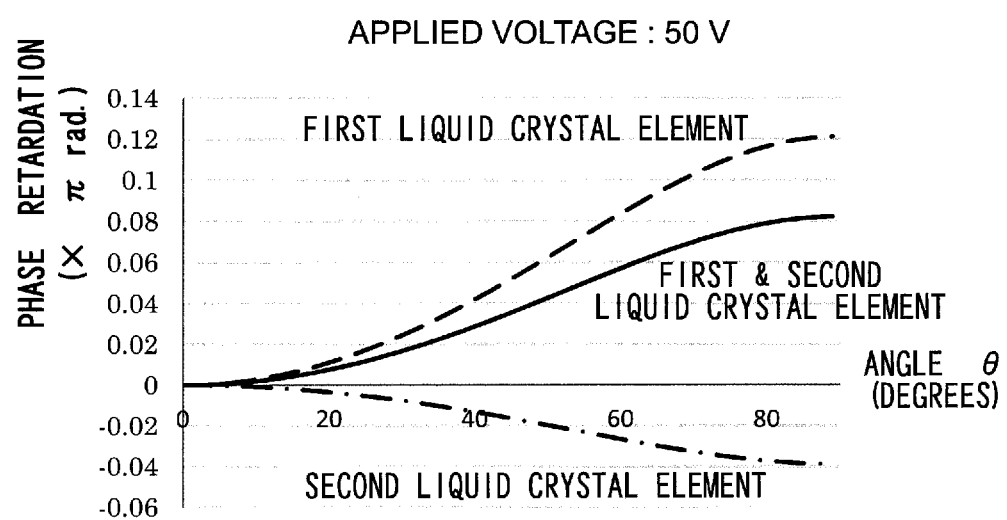
FIG. 4 is a graph showing a relationship between phase retardation and angle θ at 50V of applied voltage.
Figure 5:
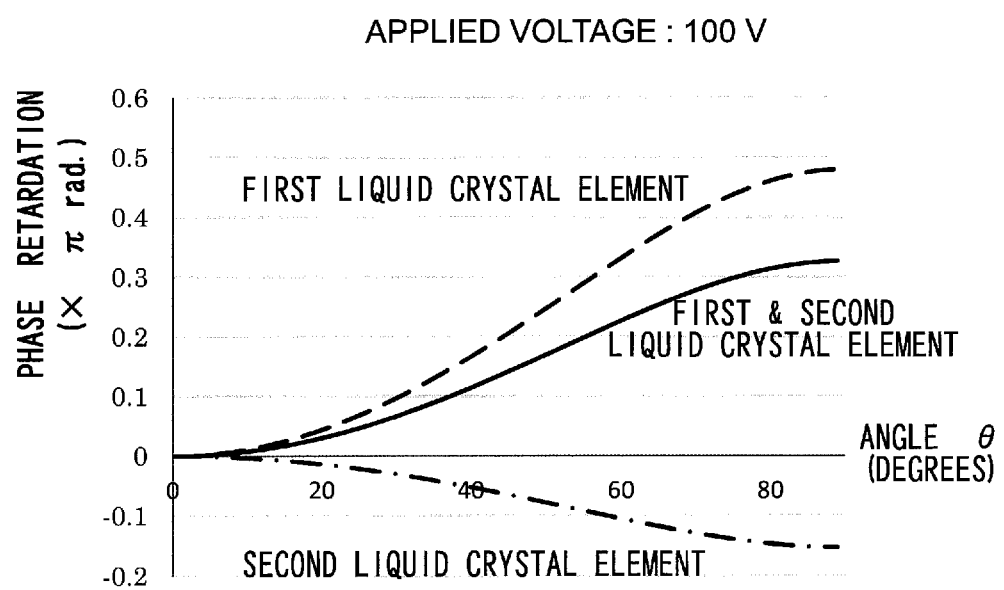
FIG. 5 is a graph showing a relationship between phase retardation and an angle θ at 100V of applied voltage.
Figure 6:
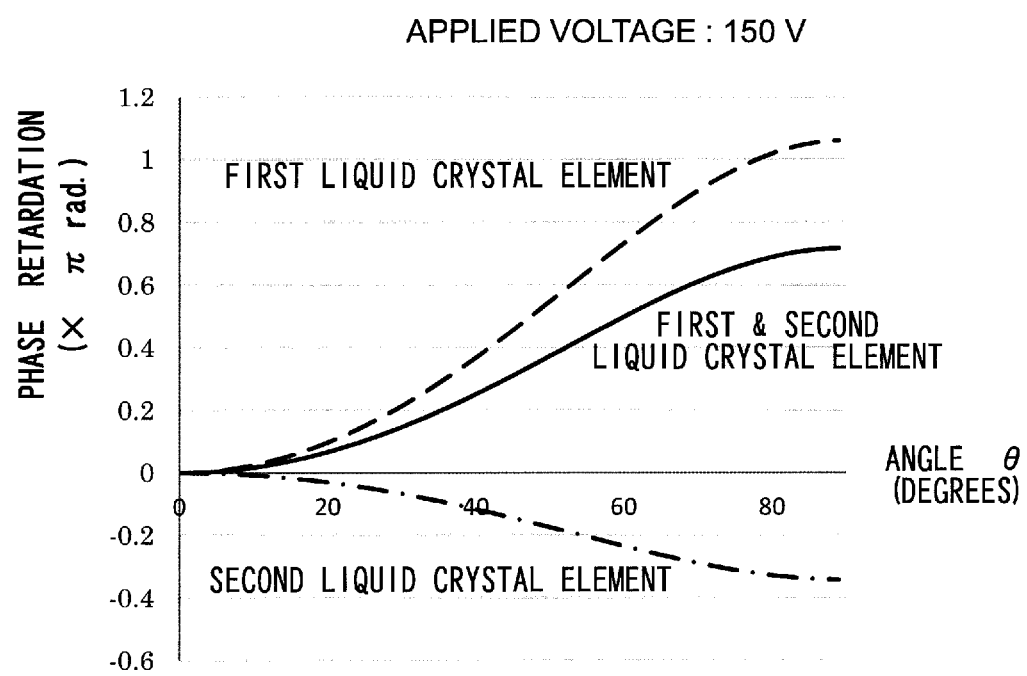
FIG. 6 is a graph showing a relationship between phase retardation and an angle θ at 150V of applied voltage.
Figure 7:
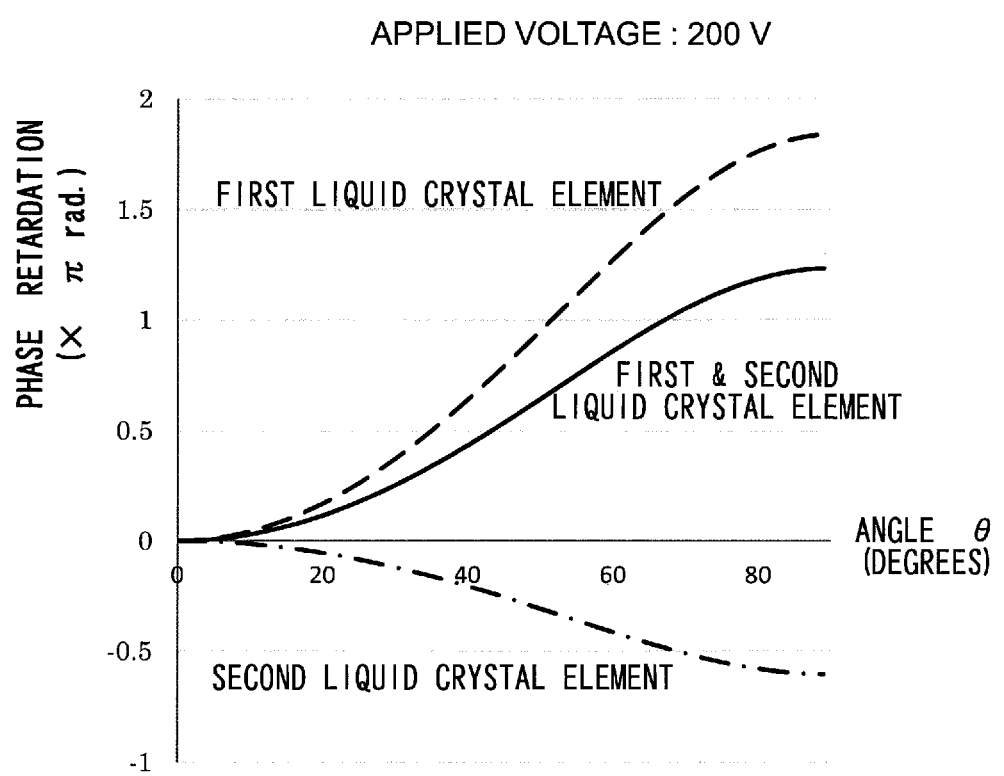
FIG. 7 is a graph showing a relationship between phase retardation and an angle θ at 200V of applied voltage.

FIGS. 3A and 3B illustrate an aspect in which a linearly polarized light obliquely impinges on the phase modulator 100. FIG. 3A, is a perspective view, and FIG. 3B is a sectional view. Directions of the optic axis of the first liquid crystal element 11 and the second liquid crystal element 12 are perpendicular to each of the surface of the liquid crystal element. Here, a case when the vibration direction of the electric field of the linearly polarized light which impinges on the first liquid crystal element 11 is the direction where there are both of p-polarized light component and s-polarized light component in the first liquid crystal element 11 or the second liquid crystal element 12.

As shown in FIG. 3B, the angle between the direction of the light impinges on the first liquid crystal element 11 or the second liquid crystal element 12 and the direction of the optic axis is referred to angle θ. As explained above, the optic axes of the first liquid crystal element 11 and the second liquid crystal element 12 are perpendicular to the surface the substrate thereof, and each of the first liquid crystal element 11 and the second liquid crystal element 12 functions as c-plate in the application condition. Therefore, when considering the polarization state of the linearly polarized light passing through the phase modulator 100, it is sufficient to take into account only the polar incident angle θ, and it is not necessary to take into account the azimuth angle for example.

The linearly polarized light which impinges on the first liquid crystal element 11 separates into a first ordinary light with a propagation vector $k_{o1}$ and a first extraordinary light with a propagation vector $k_{e1}$. Assuming the phase retardation introduced by the first liquid crystal element 11 of normal z, or the phase difference (phase retardation) between the first ordinary light and the first extraordinary light generated by the first liquid crystal element 11 of normal z is to be $\Gamma_1$, the $\Gamma_1$ is expressed by next expression (4).

$$\Gamma_1 = (k_{e1z} - k_{o1z})d_1 = n_{o1}k_{o1}d_1 \times \left(\sqrt{1 - \frac{\sin^2\theta}{n_{e1}^2}} - \sqrt{1 - \frac{\sin^2\theta}{n_{o1}^2}}\right) \quad (4)$$

In the expression (4), $k_{o1}$ is the wave vector of the first ordinary light and $k_{o1z}$ and $k_{e1z}$ are respectively the projection of the ordinary and the extraordinary wave vectors in the direction perpendicular to the substrate. The first liquid crystal element 11 is expressed as expression (5) by using Jones matrix formalism.

$$W_1(\Gamma_1) = e^{-i\varphi_1}\begin{pmatrix} e^{-i\frac{\Gamma_1}{2}} & 0 \\ 0 & e^{i\frac{\Gamma_1}{2}} \end{pmatrix}_{e,o} \quad (5)$$

In the expression (5), $\varphi_1$ represents the absolute phase change (or phase modulation) introduced in the light which passes through the first liquid crystal element 11 and is expressed by the next expression (6).

$$\varphi_1 = \frac{1}{2}(k_{e1z} + k_{o1z})d_1 = \frac{1}{2}\left[n_{o1}k_{o1}d_1 \times \left(\sqrt{1 - \frac{\sin^2\theta}{n_{e1}^2}} + \sqrt{1 - \frac{\sin^2\theta}{n_{o1}^2}}\right)\right] \quad (6)$$

In the expression (6), $k_{o1}$ is the wave vector of the first ordinary light and $k_{o1z}$ and $k_{e1z}$ are respectively the projection of the ordinary and the extraordinary wave vectors in the direction perpendicular to the substrate.

Assuming the phase retardation introduced by the second liquid crystal element 12, or the phase difference between the second ordinary light of propagation vector $k_{o2}$ and the second extraordinary light of propagation vector $k_{e2}$ generated by the second liquid crystal element 12 is to be $\Gamma_2$, the $\Gamma_2$ is expressed by next expression (7).

$$\Gamma_2 = (k_{e2z} - k_{o2z})d_2 = n_{o2}k_{o2}d_2 \times \left(\sqrt{1 - \frac{\sin^2\theta}{n_{e2}^2}} - \sqrt{1 - \frac{\sin^2\theta}{n_{o2}^2}}\right) \quad (7)$$

In the expression (7), $k_{o2}$ is the wave vector of the second ordinary light, $k_{o2z}$ and $k_{e2z}$ are respectively the projection of the ordinary and the extraordinary wave vectors in the direction perpendicular to the substrate. The second liquid crystal element 12 is expressed as expression (8) by using Jones matrix formalism.

$$W_2(\Gamma_2) = e^{-i\varphi_2}\begin{pmatrix} e^{-i\frac{\Gamma_2}{2}} & 0 \\ 0 & e^{i\frac{\Gamma_2}{2}} \end{pmatrix}_{e,o} \quad (8)$$

In the expression (8), $\varphi_2$ represents phase modulation introduced in the light which passes through the second liquid crystal element 12 and is expressed by the next expression (9).

$$\varphi_2 = \frac{1}{2}(k_{e2z} + k_{o2z})d_2 = \frac{1}{2}\left[n_{o2}k_{o2}d_2 \times \left(\sqrt{1 - \frac{\sin^2\theta}{n_{e2}^2}} + \sqrt{1 - \frac{\sin^2\theta}{n_{o2}^2}}\right)\right] \quad (9)$$

In the expression (9), $k_{o2}$ is wave vector of the second ordinary light and $k_{o2z}$ and $k_{e2z}$ are respectively the projection of the ordinary and the extraordinary wave vectors in the direction perpendicular to the substrate.

Next, a polarization state of the linearly polarized light which passes through the phase modulator 100 will be explained. The p-polarized light component and the s-polarized light component of the incident linearly polarized light impinging on the phase modulator 100 are referred to as $A_p$ and $A_s$ respectively. The p-polarized light component and the s-polarized light component of the incident linearly polarized light exiting from the phase modulator 100 are referred to as $A_{tp}$ and $A_{ts}$ respectively. The relationship between $A_p$, $A_s$ and $A_{tp}$, $A_{ts}$ is expressed by the next expression (10) by using the extended Jones matrix method.

$$\begin{pmatrix} A'_{ts} \\ A_{tp} \end{pmatrix} = e^{-i(\varphi_1 + \varphi_2)}T_{2out}R_2^{-1}\begin{pmatrix} e^{-i\frac{\Gamma_2}{2}} & 0 \\ 0 & e^{i\frac{\Gamma_2}{2}} \end{pmatrix}_{e,o} \quad (10)$$

-continued $$R_2 T_{2in} T_{1out} R_1^{-1} \begin{pmatrix} e^{-i\frac{\Gamma_1}{2}} & 0 \\ 0 & e^{i\frac{\Gamma_1}{2}} \end{pmatrix}_{e,o} R_1 T_{1in} \begin{pmatrix} A_s \\ A_p \end{pmatrix}$$

Here, $T_{1in}$ and $T_{1out}$ respectively represent Fresnel transmission coefficients matrices at the entrance surface and at the exit surface of the first liquid crystal element 11 (the first liquid crystal material). $R_1$ represents the transfer matrix between the (s, p) coordinate system and the (e, o) coordinate system of the first liquid crystal element 11. It should be noted that a light propagating inside the first liquid crystal element 11 can be described as a linear combination of s-polarized light and p-polarized light (expressed in the (s, p) coordinate system) or a linear combination of the extraordinary wave and the ordinary wave (expressed in the (e, o) coordinate system). $R_1^{-1}$ represents the inverse matrix of $R_1$. Similarly, $T_{2in}$ and $T_{2out}$ respectively represent the Fresnel transmission coefficients matrices at the entrance surface and the exit surface of the second liquid crystal element 12 (the second liquid crystal material). $R_2$ represents the transfer matrix between the (s, p) coordinate system and the (e, o) coordinate system of the second liquid crystal element 12. As the optic axes of the first liquid crystal element 11 and the second liquid crystal element 12 are mutually parallel, their (e, o) coordinate systems are the same. $R_2^{-1}$ represents an inverse matrix of $R_2$.

$R_1$, $R_2$, $R_1^{-1}$ and $R_2^{-1}$ are respectively shown as follows.

$$R_1 = \begin{bmatrix} 0 & C(\theta, n_{e1}, n_{o1}) \\ -1 & 0 \end{bmatrix}$$

$$R_2 = \begin{bmatrix} 0 & C(\theta, n_{e2}, n_{o2}) \\ -1 & 0 \end{bmatrix}$$

$$R_1^{-1} = \begin{bmatrix} 0 & -1 \\ 1/C(\theta, n_{e1}, n_{o1}) & 0 \end{bmatrix}$$

$$R_2^{-1} = \begin{bmatrix} 0 & -1 \\ 1/C(\theta, n_{e2}, n_{o2}) & 0 \end{bmatrix}$$

Where, C represents a function of the polar incident angle $\theta$, the ordinary refractive index and extraordinary refractive index for the first crystal element 11 and the second liquid crystal element 12. By applying these expressions to expression (8), expression (11) is obtained.

$$\begin{pmatrix} A'_{ts} \\ A_{tp} \end{pmatrix} = \quad (11)$$

$$e^{-i(\varphi_1+\varphi_2)} \begin{bmatrix} e^{-i\frac{\Gamma_2+\Gamma_1}{2}} t_{s1} \cdot t_{p2} \frac{C(\theta, n_{e1}, n_{o1})}{C(\theta, n_{e2}, n_{o2})} & 0 \\ 0 & e^{i\frac{\Gamma_2+\Gamma_1}{2}} t_{p1} \cdot t_{s2} \end{bmatrix} \begin{pmatrix} A_s \\ A_p \end{pmatrix}$$

Where, $t_{s1}$ and $t_{p1}$ respectively represent the transmission coefficients of the s-polarized light and p-polarized light entering and passing through the first liquid crystal element 11, while $t_{s2}$ and $t_{p2}$ respectively represent the transmission coefficients of the s-polarized light and p-polarized light entering and passing through the second liquid crystal element 12. It should be noted that $\Gamma_1+\Gamma_2$ represents a total phase difference between the ordinary light and the extraordinary light generated by the phase modulator 100.

For simplifying the explanation, it is assumed that the thickness of the first liquid crystal material layer of the first liquid crystal element 11 is substantially equal to the thickness of a layer of the second liquid crystal material of the second liquid crystal element 12 in the phase modulator 100. That is, $d_1=d_2=d$. It is also assumed that the relationship of $n_{e1}-n_{o1}=n_{o2}-n_{e2}$ is satisfied, when certain voltage within a predetermined range is applied to each of the first liquid crystal element 11 and the second liquid crystal element 12. Then, in FIG. 2, the relationships of $D_{H1}=D_{H2}$ and $D_{L1}=D_{L2}$ are satisfied. In these conditions, with respect to the phase difference $\Gamma_1$ and the phase difference $\Gamma_2$, magnitudes thereof are the same and signs thereof are inverse to each other. Thus, the relationship of $\Gamma_2=-\Gamma_1$ is satisfied.

It should be noted that each of the differences between the ordinary refractive index and the extraordinary refractive index generated in the first liquid crystal element 11 and the second liquid crystal element 12 are sufficiently smaller than the ordinary refractive index or the extraordinary refractive index. Therefore, next relationships are satisfied.

$$n_{e1}-n_{o1} \ll n_{e1}, n_{o1}$$

$$n_{e2}-n_{o2} \ll n_{e2}, n_{o2}$$

Therefore, in expression (11), next relationship is satisfied.

$$C(\theta, n_{e1}, n_{o1}) \approx C(\theta, n_{e2}, n_{o2})$$

Then, applying $C(\theta, n_{e1}, n_{o1})=C(\theta, n_{e2}, n_{o2})$ to expression (11), expression (11) can be written as next expression (12).

$$\begin{pmatrix} A'_{ts} \\ A_{tp} \end{pmatrix} = e^{-i(\varphi_1+\varphi_2)} t_{s1} \cdot t_{p2} \cdot t_{p1} \cdot t_{s2} \begin{pmatrix} A_s \\ A_p \end{pmatrix} \quad (12)$$

In expression (12), as $e^{-i(\varphi_1+\varphi_2)}$ is a value based on phase modulation ($\varphi_1+\varphi_2$), and $t_{s1}$, $t_{p2}$, $t_{p1}$ and $t_{s2}$ are all transmission coefficients, the corresponding product of these quantities is also a scalar quantity. $A_{ts}$ and $A_{tp}$ are respectively obtained by multiplying $A_s$ and $A_p$ by the same scalar quantity. Therefore, as the ratio of the amplitudes of the s-polarized light component and the p-polarized light component is maintained while passing through the phase modulator 100, the direction of polarization does not change. In other words, a polarization state of the linearly polarized light is preserved, when propagating through the phase modulator 100 under oblique incidence.

The total phase difference introduced between the ordinary light and the extraordinary light when propagating through the first liquid crystal element 11 and the second liquid crystal element 12 is represented by $\Gamma_1+\Gamma_2$. By using expressions (4) and (7), $\Gamma_1+\Gamma_2$ is expressed as expression (13).

$$\Gamma_1+\Gamma_2 = (k_{e1z}-k_{o1z})d_1+(k_{e2z}-k_{o2z})d_2 = \quad (13)$$

$$n_{o1}k_{o1}d_1 \times \left(\sqrt{1-\frac{\sin^2\theta}{n_{e1}^2}}-\sqrt{1-\frac{\sin^2\theta}{n_{o1}^2}}\right)+$$

$$n_{o2}k_{o2}d_2 \times \left(\sqrt{1-\frac{\sin^2\theta}{n_{e2}^2}}-\sqrt{1-\frac{\sin^2\theta}{n_{o2}^2}}\right)$$

In the case of $d_1=d_2=d$, expression (13) is expressed as expression (14).

-continued $$\Gamma_1 + \Gamma_2 = (k_{e1z} - k_{o1z})d + (k_{e2z} - k_{o2z})d = \quad (14)$$

$$n_{o1}k_{o1}d \times \left( \sqrt{1 - \frac{\sin^2\theta}{n_{e1}^2}} - \sqrt{1 - \frac{\sin^2\theta}{n_{o1}^2}} \right) +$$

$$n_{o2}k_{o2}d \times \left( \sqrt{1 - \frac{\sin^2\theta}{n_{e2}^2}} - \sqrt{1 - \frac{\sin^2\theta}{n_{o2}^2}} \right)$$

In expressions (13) and (14), the first term represents the phase difference between the ordinary light and the extraordinary light generated in the first liquid crystal element 11, and the second term represents the phase difference between the ordinary light and the extraordinary light generated in the second liquid crystal element 12. In expression (14), the sign of the first term is positive and the sign of the second term is negative. In other words, the phase difference once introduced between the ordinary light and the extraordinary light generated in the first liquid crystal element 11 decreases as the ordinary light and the extraordinary light propagate through the second liquid crystal element 12. By selecting the liquid crystal materials having suitable ordinary refractive index and the extraordinary refractive index, the value of right side of expression (13) or (14) can be to near zero.

Embodiment 1: Simulation of Relationship Between Propagation Angle of the Light and Phase Difference The simulation is conducted by using the phase modulator shown in FIG. 1. A polymer stabilized blue phase liquid crystal material PSBP 1855 in which base resin is a nematic liquid crystal material 1855 (manufactured by the Institute of Chemistry, Military University of Technology, Warsaw, Poland) is selected as the first liquid crystal material 1. Also, a polymer stabilized blue phase liquid crystal material PSBP 1754F in which base resin is a nematic liquid crystal material 1754 (manufactured by the Institute of Chemistry, Military University of Technology, Warsaw, Poland) is selected as the second liquid crystal material 2. The liquid crystal material PSBP 1855 as the first liquid crystal material 1 shows positive dielectric anisotropy ($\Delta\varepsilon > 0$) and the liquid crystal material PSBP 1754F as the second liquid crystal material 2 shows negative dielectric anisotropy The liquid crystal material PSBP 1855 as the first liquid crystal material 1 has a first Kerr constant $K_1$ of 0.447 (nm/V$^2$) and the first isotropy refractive index $n_{iso1}$ of 1.55. Also, the liquid crystal material PSBP 1754F as the second liquid crystal material 2 has a second Kerr constant $K_2$ of −0.13 (nm/V$^2$) and the second isotropy refractive index $n_{iso2}$ of 1.5. It should be noted that the first isotropy refractive index $n_{iso1}$ and the second isotropy refractive index $n_{iso2}$ are estimated from usual value of refractive indices. The values of $d_1$ and $d_2$ are both 10 μm.

In general, the relationship between the ordinary refractive index and the extraordinary refractive index of an liquid crystal element composed of blue phase liquid crystal is expressed as expressions (15) and (16).

$$n_o = n_{iso} - \Delta n_{ind}/3 \quad (15)$$

$$n_e = n_{iso} + 2\Delta n_{ind}/3 \quad (16)$$

Here, $\Delta n_{ind}$ is the birefringence induced in the liquid crystal element when changing from the non-application condition to the application condition. It is expressed as expression (17) in general.

$$\Delta n_{ind} = \lambda K E^2 \quad (17)$$

Here, K is the Kerr constant of the liquid crystal material and E is an intensity of an electric field applied to the liquid crystal element.

Therefore, it is possible to calculate the induced birefringence $\Delta n_{ind}$ for each applied voltage to the first liquid crystal element 11 and the second liquid crystal element 12 by using expression (17). By using values calculated from expression (17) inside expressions (15) and (16), the ordinary refractive index and the extraordinary refractive index of both the first liquid crystal element 11 and the second liquid crystal element 12 can be calculated for each voltage.

By using the values of the ordinary refractive index and the extraordinary refractive index calculated as described inside expressions (4), (7) and (14), it is possible to calculate, for an incident linearly polarized light, the phase differences depending on the applied voltage that are being introduced in each case, by passing through only the first liquid crystal element 11; through only the second liquid crystal element 12; and through both of the first liquid crystal element 11 and the second liquid crystal element 12. It should be noted that both of the thicknesses of the first liquid crystal material 1 and the second liquid crystal material 2 are 10 μm.

Each of FIGS. 4-7 shows the phase differences between the ordinary light and the extraordinary light at each of the corresponding applied voltages: 50V, 100V, 150V and 200V that are calculated by the procedure explained above. In each of FIGS. 4-7, the vertical axis shows the phase differences between the ordinary light and the extraordinary light, and the horizontal axis shows the variation of the polar incident angle θ that is the angle between the direction of the light impinges on the first liquid crystal element 11 or the second liquid crystal element 12 and the direction of the optic axis. Also in each of FIGS. 4-7, a dashed line represents the phase difference between the ordinary light and the extraordinary light generated in the first liquid crystal element 11. A dashed dotted line represents the phase difference between the ordinary light and the extraordinary light generated in the second liquid crystal element 12. A solid line represents the total phase difference between the ordinary light and the extraordinary light generated in both of the first liquid crystal element 11 and the second liquid crystal element 12 (that is, the phase modulator 100). It should be noted that scales of each of FIGS. 4-7 are not the same for visibility reasons.

From FIGS. 4-7, it can be understood that the larger the angle θ the larger the phase difference between the ordinary light and the extraordinary light for any applied voltages of 50V, 100V, 150V and 200V. These characteristics are common in each case: for the first liquid crystal element 11, for the second liquid crystal element 12, and for both the first liquid crystal element 11 and the second liquid crystal element 12.

The phase difference between the ordinary light and the extraordinary light generated in the first liquid crystal element 11 has opposite sign of the phase difference between the ordinary light and the extraordinary light generated in the second liquid crystal element 12. As a result, in the case that the linearly polarized light passes through the first liquid crystal element 11 and the second liquid crystal element 12 in series, the phase difference between the ordinary light and the extraordinary light generated in the first liquid crystal element 11 is lessoned by the phase difference between the ordinary light and the extraordinary light generated in the second liquid crystal element 12.

From FIGS. 4-7, it can be understood that although the phase difference between the ordinary light and the extraordinary light in the first liquid crystal element 11 is not completely offset by that generated in the second liquid crystal element 12, the phase difference is held being as low as ⅔ of the phase difference between the ordinary light and the extraordinary light generated only by the first liquid crystal element 11.

That is, Kerr constants $K_1$ and $K_2$ respectively of the first liquid crystal material 1 and the second liquid crystal material 2 are 0.447 (nm/V$^2$) and −0.13 (nm/V$^2$), and although these values exhibit opposite sign, the absolute value of $K_2$ is small and its value is around one fourth of that of $K_1$. It is possible to minimize the total phase difference between the ordinary light and the extraordinary light by suitably selecting and combining liquid crystal materials constituting the first liquid crystal material 1 and the second liquid crystal material 2.

Next, the phase modulation (phase shift) generated by the phase modulator 100 will be explained. With respect to the amount of the phase modulation, it is appropriate to consider the case in which the linearly polarized light of wavelength λ propagates in the direction perpendicular to the substrates of the phase modulator 100.

The first ordinary refractive index when the first liquid crystal element 11 is in the application condition under an applied voltage of $V_1$ is designated as $n_{o1}(V_1)$. When the first liquid crystal element 11 is in the non-application condition, the first isotropy refractive index is $n_{iso1}$. Therefore, the phase modulation λ generated by changing the first liquid crystal element 11 from the non-application condition to the application condition by applying a voltage $V_1$ is expressed as expression (18).

$$\varphi_1 = 2\pi d_1(n_{iso1} - n_{o1}(V_1))/\lambda \qquad (18)$$

Here, $d_1$ represents the thickness of the first liquid crystal material 1 of the first liquid crystal element 11.

Similarly, the second ordinary refractive index when the second liquid crystal element 12 is in the application condition under an applied voltage of $V_1$ is designated as $n_{o2}(V_1)$. When the second liquid crystal element 12 is in the non-application condition, the second isotropy refractive index is $n_{iso2}$. Therefore, the phase modulation $\varphi_2$ generated by changing the second liquid crystal element 12 from the non-application condition to the application condition by applying a voltage $V_1$ is expressed as expression (19).

$$\varphi_2 = 2\pi d_2(n_{iso2} - n_{o2}(V_1))/\lambda \qquad (19)$$

Here, $d_2$ represents the thickness of the second liquid crystal material 2 of the second liquid crystal element 12.

By combining expressions (18) and (19), the total phase modulation experienced by the linearly polarized light passing through the phase modulator 100 is expressed as expression (20).

$$\varphi_1 + \varphi_2 = 2\pi/\lambda (d_1(n_{iso1} - n_{o1}(V_1)) + d_2(n_{iso2} - n_{o2}(V_1))) \qquad (20)$$

If $d_1 = d_2 = d$, expression (20) can be written as expression (21).

$$\varphi_1 + \varphi_2 = 2\pi d/\lambda ((n_{iso1} - n_{o1}(V_1)) + (n_{iso2} - n_{o2}(V_1))) \qquad (21)$$

As explained above by referring to FIG. 2, the decreasing rate of the first ordinary index $n_{o1}$ is larger than the increasing rate of the second ordinary index $n_{o2}$. In other words, next relationship is satisfied.

$$|n_{iso1} - n_{o1}(V_1)| > |n_{iso2} - n_{o2}(V_1)|$$

Therefore, $$(n_{iso1} - n_{o1}(V_1)) + (n_{iso2} - n_{o2}(V_1)) \neq 0$$

Thus, right side of expression (21) does not become zero, and the phase modulator can generate a certain amount of phase modulation.

Here, a phase modulator using blue phase liquid crystal material for the liquid crystal elements of the phase modulator 100 will be explained. In the non-application condition, the blue phase liquid crystal material shows optical isotropy, and the isotropy refractive index is represented as $n_{iso}$. When the liquid crystal element is changed from the non-application condition to the application condition, birefringence occurs in the blue phase liquid crystal material. As the direction of the applied electric field to the liquid crystal element is perpendicular to the substrates of the liquid crystal element, its fast axis is in the direction perpendicular to the substrate of this liquid crystal element and its slow axis is in the direction parallel to the substrate of this liquid crystal element. Therefore, with respect to the linearly polarized light propagating in the direction perpendicular to the substrate of the liquid crystal element, the refractive index in the direction perpendicular to the substrate is the extraordinary refractive index $n_e$ and the refractive index in the direction parallel to the substrate is the ordinary refractive index $n_o$.

Among the isotropy refractive index $n_{iso}$, the extraordinary refractive index $n_e$ and the ordinary refractive index $n_o$, it is known that there is a relationship as expressed in expression (22).

$$n_{iso} = (n_e + 2n_o)/3 \qquad (22)$$

Therefore, the refractive index change δn, experienced by the linearly polarized light propagating in the direction perpendicular to the substrate of the liquid crystal element, by changing the state of the liquid crystal element from the non-application condition to the application condition can be expressed as expression (23).

$$\delta n = n_o - n_{iso} \qquad (23)$$

Then, by using the relationship in expression (22) to expression (23), expression (24) is derived.

$$\delta n \approx (n_e - n_o)/3 = \Delta n_{ind}/3 \qquad (24)$$

Here, $\Delta n_{ind}$ ($=n_e - n_o$) corresponds to the birefringence occurs in the liquid crystal element by changing from the non-application condition to the application condition.

By using the relationships of expressions (23) and (24), expression (20) can be modified to expression (25).

$$\varphi_1 + \varphi_2 = 2\pi/3\lambda (d_1(n_{e1}(V_1) - n_{o1}(V_1)) + d_2(n_{e2}(V_1) - n_{o2}(V_1))) \qquad (25)$$

If $d_1 = d_2 = d$, expression (25) is expressed as expression (26).

$$\varphi_1 + \varphi_2 = 2\pi d/3\lambda ((n_{e1}(V_1) - n_{o1}(V_1)) + (n_{e2}(V_1) - n_{o2}(V_1))) \qquad (26)$$

In this respect, the phase modulation by the phase modulator 100 can be expressed as expression (25) or expression (26).

As explained above, in the blue phase liquid crystal material, it is known that the birefringence $\Delta n_{id}$ can be expressed as expression (17).

$$\Delta n_{ind} = \lambda K E^2 \qquad (17)$$

By applying the relationship shown in expression (17) to the first liquid crystal element 11 and the second liquid crystal element 12, expression (25) can be modified to expression (27).

$$\varphi_1 + \varphi_2 = 2\pi (d_1 K_1 + d_2 K_2) E^2/3 \qquad (27)$$

If $d_1 = d_2 = d$, expression (27) is expressed as expression (28).

$$\varphi_1 + \varphi_2 = 2\pi d (K_1 + K_2) E^2/3 \qquad (28)$$

In this respect, the phase modulation by the phase modulator 100 can also be obtained by expression (27) or expression (28).

Here, as illustrated in FIG. 2, in the first liquid crystal element 11, as the sign of $\Delta n_{ind1}$ is positive, the first Kerr constant $K_1$ is positive. In contrast, in the second liquid crystal element 12, as the sign of $\Delta n_{ind2}$ is negative, the second Kerr constant $K_2$ is negative.

Embodiment 2: Simulation of Relationship Between Applied Voltage and Phase Modulation The simulation is conducted by using the relationship expressed as expression (28). The same liquid crystal materials are selected for the first liquid crystal material 1 and the second liquid crystal material 2 as those used in the embodiment 1. In other words, polymer stabilized blue phase liquid crystal materials of PSBP 1855 and PSBP 1754F are selected as the first liquid crystal material 1 and the second liquid crystal material 2 respectively. As already described above, the first Kerr constant $K_1$ of the first liquid crystal material 1 is 0.447 (nm/V$^2$) and the second Kerr constant $K_2$ of the second liquid crystal material 2 is −0.13 (nm/V$^2$).

Figure 8:
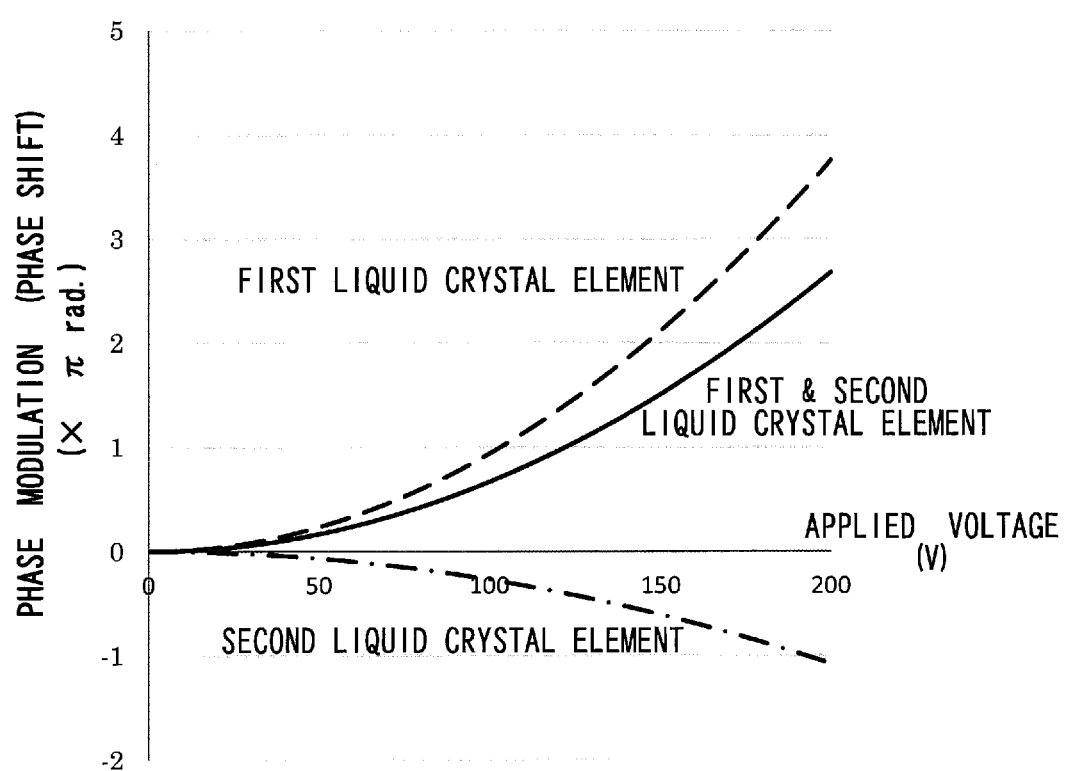
FIG. 8 is a graph showing a relationship between applied voltage and phase modulation (phase shift).

In expression (28), by using above described Kerr constants and various electric fields intensities according to various applied voltages, the relationships between the applied voltage and the phase modulation experienced by the linearly polarized light are obtained in each case, when passing through the first liquid crystal element 11, the second liquid crystal element 12, and both of the first liquid crystal element 11 and the second liquid crystal element 12. FIG. 8 shows the result.

In FIG. 8, the vertical axis shows the phase modulation (phase shift) and the horizontal axis shows the voltage applied to the first liquid crystal element 11 and the second liquid crystal element 12. Also in FIG. 8, a dashed line represents the phase modulation generated in the first liquid crystal element 11. A dashed dotted line represents the phase modulation generated in the second liquid crystal element 12. A solid line represents the total phase modulation generated in both of the first liquid crystal element 11 and the second liquid crystal element 12 (that is, the phase modulator 100).

From FIG. 8, it can be understood that the larger the voltage applied to the first liquid crystal element 11 and the second liquid crystal element 12, the larger the absolute value of phase modulation generated both in the first liquid crystal element 11 and the second liquid crystal element 12. The sign of the phase modulation generated by the first liquid crystal element 11 is opposite to the sign of the phase modulation generated by the second liquid crystal element 12. This is because the sign of the first Kerr constant $K_1$ is opposite to the sign of the second Kerr constant $K_2$.

The phase modulation introduced by the phase modulator 100 is the sum of the phase modulation introduced by the first liquid crystal element 11 and the phase modulation introduced by the second liquid crystal element 12. Therefore, the total phase modulation introduced by the phase modulator 100 is smaller than the phase modulation introduced only by the first liquid crystal element 11 by a quantity equal to the phase modulation by the second liquid crystal element 12. At the same time, the phase modulation introduced by the second liquid crystal element 12 is sufficiently small in comparison to one introduced by the first liquid crystal element 11. As a result, with the phase modulator 100, for instance, it is possible to obtain a phase modulation in a range between 0 and $2\pi$ by changing an applied voltage in a range between 0V and 175V. Thus the phase modulator 100 is practical.

Variation 1

In above explained Embodiment 1 and Embodiment 2, the simulations are conducted in the case that blue phase liquid crystal materials are used as both of the first liquid crystal material 1 and the second liquid crystal material 2. However, it is possible to use liquid crystal material other than blue phase liquid crystal material. For instance, helical polymer nanocomposite material can be used as the first liquid crystal material 1 and/or the second liquid crystal material 2. In this case, next shown expression (29) is used instead of expression (24).

$$\delta n = (n_e - n_o)/2 = \Delta n_{ind}/2 \qquad (29)$$

Variation 2

Figure 9:
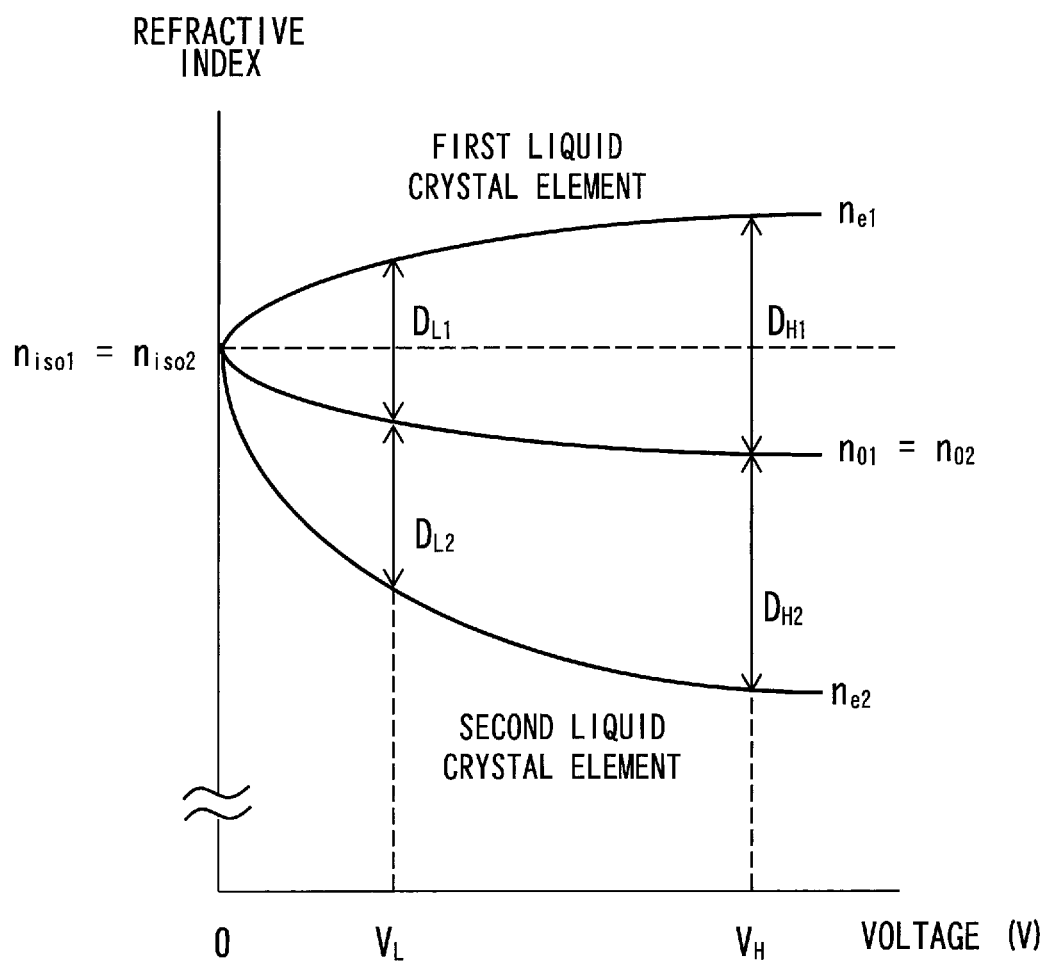
FIG. 9 is a schematic diagram showing the relationship between applied voltage to the liquid crystal elements and refractive indices of the liquid crystal elements in the phase modulator according to one of the variations of the present invention.

In above explained embodiments, the relationship between the applied voltage and refractive indices is explained by using FIG. 2. However, the relationship between applied voltage and refractive indices is not limited. For instance, it is possible to configure the phase modulator 100 by using the first liquid crystal element 11 and the second liquid crystal element 12, such as they present the relationship between the applied voltage and the refractive indices as shown in FIG. 9. In this case, the first ordinary refractive index $n_{o1}$ and the second ordinary refractive index $n_{o2}$ decrease in the same manner when increasing the voltage applied to the first liquid crystal element 11 and the second liquid crystal element 12. As a result, it is expected to obtain large amount of phase modulation, because signs of phase modulations by the first liquid crystal element 11 and the second liquid crystal element 12 are the same.

Also in the first liquid crystal element 11 and the second liquid crystal element 12 as illustrated in FIG. 9, it is preferred that in the application condition, the absolute value of the difference between the ordinary refractive index and the extraordinary refractive index of the first liquid crystal element 11 and that of the second liquid crystal element 12 are near. In other words, in the state when a voltage $V_H$ is applied to each of the first liquid crystal element 11 and the second liquid crystal element 12, supposing $n_{e1}(V_H) - n_{o1}(V_H) = D_{H1}$, $n_{o2}(V_H) - n_{e2}(V_H) = D_{H2}$, it is preferable that the values of $D_{H1}$ and $D_{H2}$ are near, and it is more preferable that $D_{H1} = D_{H2}$ is satisfied. Similarly, in the state when a voltage $V_L$ is applied to each of the first liquid crystal element 11 and the second liquid crystal element 12, supposing $n_{e1}(V_L) - n_{o1}(V_L) = D_{L1}$, $n_{o2}(V_L) - n_{e2}(V_L) = D_{L2}$, it is preferable that the values of $D_{L1}$ and $D_{L2}$ are near, and it is more preferable that $D_{L1} = D_{L2}$ is satisfied.

It should be noted that, in FIG. 9, in order to clearly show that the first ordinary refractive index $n_{o1}$ and the second ordinary refractive index $n_{o2}$ decrease in the same manner when increasing the applied voltage, the first isotropy refractive index $n_{iso1}$ and the second isotropy refractive index $n_{iso2}$ are shown as equal. However, these do not necessarily need to be the same.

Variation 3

In the above described embodiments, it is explained by assuming that the liquid crystal elements are disposed at positions set apart from one another. However, the present invention is not limited to this manner and the liquid crystal elements may be disposed in contact with one another. Furthermore, contacted two liquid crystal elements may have one substrate between them in common.

Variation 4

In the above described embodiments, it is explained that the phase modulator 100 is composed of two liquid crystal elements of the first liquid crystal element 11 and the second liquid crystal element 12. However, at least one of the first liquid crystal element 11 and the second liquid crystal element 12 comprises a plurality of liquid crystal elements.

Variation 5

Figure 10:
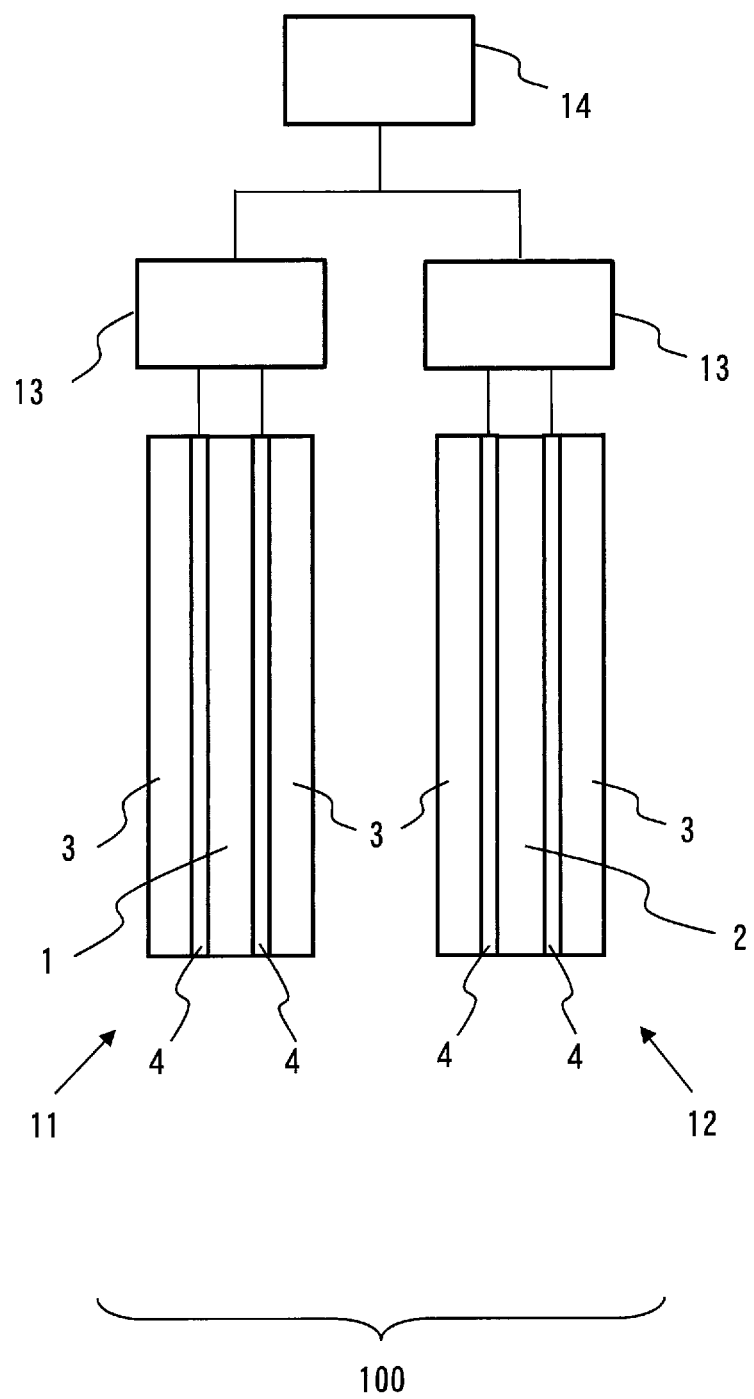
FIG. 10 is a schematic diagram of a phase modulator equipped with power supplies and a control unit.

The phase modulator 100 may include a power supply that supplies voltage to the first liquid crystal element 11 and the second liquid crystal element 12 and/or a control unit that controls so as to apply a predetermined range of voltage to the first liquid crystal element 11 and the second liquid crystal element 12. Such constitution is shown in FIG. 10. In FIG. 10, a power supply 13 supplies a predetermined range of voltage between the pair of substrates of the first liquid crystal element 11 and between the pair of substrates of the second liquid crystal element 12. A control unit 14 controls the power supply 13 so as to apply a predetermined range of voltage to the first liquid crystal element 11 and the second liquid crystal element 12. As it is illustrated in FIG. 10, there may be two power supplies or may be one power supply that supplies to both of the first liquid crystal element 11 and the second liquid crystal element 12.

Variation 6

Figure 11:
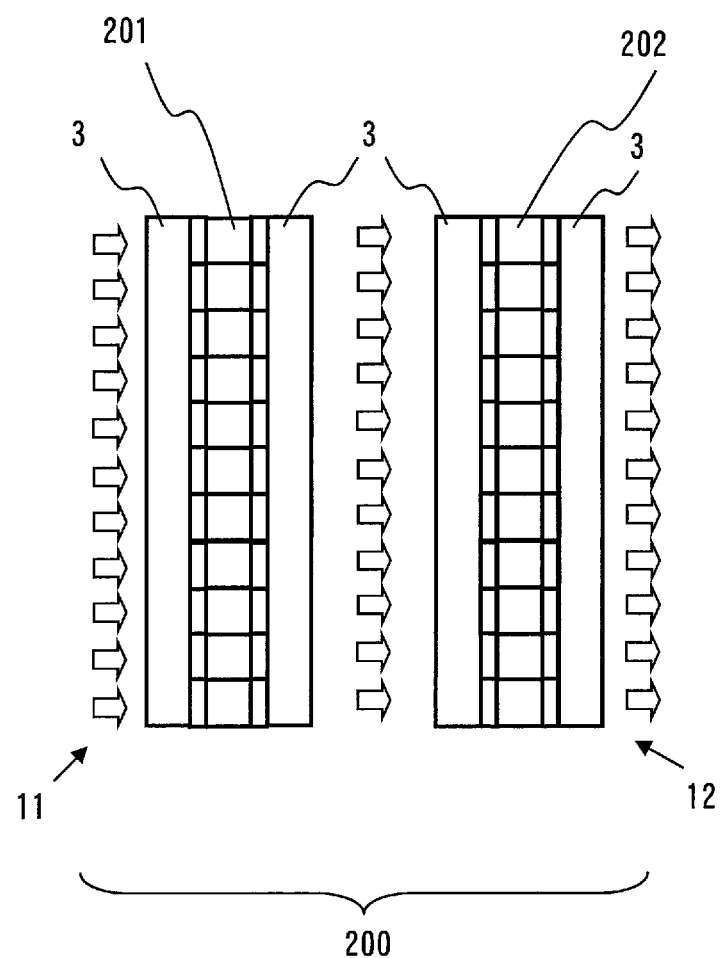
FIG. 11 is a schematic diagram showing the structure of a phase modulator, configured by using liquid crystal elements each having divisional liquid crystal areas.

The embodiments have been described by assuming that each liquid crystal element is engaged in operation as a whole. However, the present invention is not limited to this example and it may be adopted in conjunction with liquid crystal elements each having a plurality of separate divisional liquid crystal areas arranged in a two-dimensional array. A phase modulator adopting such a configuration should be structured by ensuring that the voltages applied to these separate divisional liquid crystal areas can be individually controlled and that the divisional liquid crystal areas in one liquid crystal substrate are set in correspondence to the divisional liquid crystal areas in another liquid crystal substrate. FIG. 11 shows a phase modulator 200 adopting this configuration. In the phase modulator 200 in FIG. 11, divisional liquid crystal area 201 formed in one liquid crystal element each corresponds to one of the divisional liquid crystal areas 202 formed in another liquid crystal element so that light propagates between each pair of divisional liquid crystal areas set corresponding to each other but light does not propagate from one divisional liquid crystal area to another divisional liquid crystal area that are not in correspondence to each other. It is to be noted that FIG. 11 does not include illustration of the light sources or the control device.

EXPLANATION OF REFERENCE NUMERALS 1 first liquid crystal material
2 second liquid crystal material
3 substrate
4 electrode
11 first liquid crystal element
12 second liquid crystal element
100, 200 phase modulator
201, 202 divisional liquid crystal area

The invention claimed is:

1. A phase modulator comprising; a first liquid crystal element in which a first liquid crystal material is filled between a pair of substrates facing each other, and a second liquid crystal element in which a second liquid crystal material is filled between a pair of substrates facing each other, wherein:
the first liquid crystal element and the second liquid crystal element are arranged so that a light passes through the first liquid crystal element and the second liquid crystal element;
in the state in which no voltage is applied between the pair of substrates of the first liquid crystal element nor between the pair of substrates of the second liquid crystal element, the first liquid crystal material shows optical isotropy with a first isotropy refractive index and the second liquid crystal material shows optical isotropy with a second isotropy refractive index; and
in the state in which a predetermined range of voltage is applied both between the pair of substrates of the first liquid crystal element and between the pair of substrates of the second liquid crystal element, the first liquid crystal material shows optically uniaxial anisotropy with a first ordinary refractive index and a first extraordinary refractive index which is larger than the first ordinary refractive index, and the second liquid crystal material shows optically uniaxial anisotropy with a second ordinary refractive index and a second extraordinary refractive index which is smaller than the second ordinary refractive index.

2. The phase modulator according to claim 1, wherein:
both of the first liquid crystal material and the second liquid crystal material are blue phase liquid crystal material.

3. The phase modulator according to claim 1, wherein:
in the state in which the first liquid crystal material shows optically uniaxial anisotropy, an optic axis of the first liquid crystal material is perpendicular to each substrate of the first liquid crystal element; and
in the state in which the second liquid crystal material shows optically uniaxial anisotropy, an optic axis of the second liquid crystal material is perpendicular to each substrate of the second liquid crystal element.

4. The phase modulator according to claim 1, wherein:
the sum of a value calculated by subtracting the first ordinary refractive index from the first isotropy refractive index and a value calculated by subtracting the second ordinary refractive index from the second isotropy refractive index has a value other than zero.

5. The phase modulator according to claim 1, wherein the thickness of a layer of the first liquid crystal material of the first liquid crystal element is substantially equal to the thickness of a layer of the second liquid crystal material of the second liquid crystal element.

6. The phase modulator according to claim 5, wherein:
in the state in which any voltage in the predetermined range is applied both between the pair of substrates of the first liquid crystal element and between the pair of substrates of the second liquid crystal element, the absolute value of the difference between the first ordinary refractive index and the first extraordinary refractive index is substantially equal to the absolute value of the difference between the second ordinary refractive index and the second extraordinary refractive index.

7. The phase modulator according to claim 1, wherein:
the first isotropy refractive index and the second isotropy refractive index are substantially equal to each other; and
in the state in which any voltage in the predetermined range is applied both between the pair of substrates of the first liquid crystal element and between the pair of substrates of the second liquid crystal element, the first ordinary refractive index and the second ordinary refractive index are substantially equal to each other.

8. The phase modulator according to claim 1, wherein at least one of the first liquid crystal element and the second liquid crystal element comprises a plurality of liquid crystal elements.

9. The phase modulator according to claim 1, further comprising a control unit that controls so as to apply a predetermined range of voltage between the pair of substrates of the first liquid crystal element and between the pair of substrates of the second liquid crystal element.

10. The phase modulator according to claim 9, wherein:
each of the first liquid crystal element and the second liquid crystal element is divided into a plurality of separate divisional liquid crystal areas arranged in a two-dimensional array:
the divisional liquid crystal areas in the first liquid crystal element arrayed correspondingly to the divisional liquid crystal areas arrayed in the second liquid crystal element; and
the control unit executes control so as to apply voltages individually to each of the divisional liquid crystal areas.

11. An optical device comprising the phase modulator according to claim 1.

* * * * *